US012595540B2

(12) United States Patent
Matsuda et al.

(10) Patent No.: US 12,595,540 B2
(45) Date of Patent: Apr. 7, 2026

(54) STEEL SHEET AND PLATED STEEL SHEET

(71) Applicant: NIPPON STEEL CORPORATION, Tokyo (JP)

(72) Inventors: Keitaro Matsuda, Tokyo (JP); Hiroshi Takebayashi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 32 days.

(21) Appl. No.: 18/717,967

(22) PCT Filed: Dec. 9, 2022

(86) PCT No.: PCT/JP2022/045513
§ 371 (c)(1),
(2) Date: Jun. 7, 2024

(87) PCT Pub. No.: WO2023/106411
PCT Pub. Date: Jun. 15, 2023

(65) Prior Publication Data
US 2025/0051895 A1     Feb. 13, 2025

(30) Foreign Application Priority Data

Dec. 9, 2021     (JP) .................................. 2021-200342

(51) Int. Cl.
*C22C 38/58*        (2006.01)
*B32B 15/01*        (2006.01)
(Continued)

(52) U.S. Cl.
CPC ............ *C22C 38/58* (2013.01); *B32B 15/013* (2013.01); *B32B 15/04* (2013.01); *B32B 15/043* (2013.01);
(Continued)

(58) Field of Classification Search
CPC ......... C23C 2/02; C23C 2/0224; C23C 2/024; C23C 2/06; C23C 2/12; C23C 2/28;
(Continued)

(56) References Cited

U.S. PATENT DOCUMENTS

2015/0232977 A1      8/2015  Sato et al.
2024/0009962 A1*     1/2024  Yamamoto .............. C22C 38/38

FOREIGN PATENT DOCUMENTS

JP        2010-65269  A      3/2010
JP        2011-153367 A      8/2011
(Continued)

*Primary Examiner* — Michael E. La Villa
(74) *Attorney, Agent, or Firm* — Birch, Stewart, Kolasch & Birch, LLP

(57) ABSTRACT

Steel sheet and plated steel sheet comprised of steel sheet with a thin thickness in which sufficient strength and plateability or chemical convertibility are both achieved, i.e., steel sheet having a chemical composition containing, by mass %, C: 0.05 to 0.30%,
Si: 0.01 to 2.50%,
Mn: 0.80 to 3.00%,
Al: 0.010 to 2.000%, etc. and having a balance comprising Fe and impurities and
having a thickness of 0.4 to 2.0 mm,
in which steel sheet,
a tensile strength is 550 to 1500 MPa,
an internal oxidation layer and decarburized layer are contained,
when a thickness of the decarburized layer per side of the steel sheet: A (μm), a bulk C concentration of the steel sheet: Cb (%), and a thickness of the steel sheet: t (mm),
(Continued)

$0.01 \leq A/t \leq 0.15$, and
a C concentration at the ½A position is Cb/2 or more and
plated steel sheet using that steel sheet.

6 Claims, 2 Drawing Sheets

(51) Int. Cl.

| | |
|---|---|
| *B32B 15/04* | (2006.01) |
| *B32B 15/18* | (2006.01) |
| *C21D 1/26* | (2006.01) |
| *C21D 1/76* | (2006.01) |
| *C21D 3/04* | (2006.01) |
| *C21D 8/02* | (2006.01) |
| *C21D 8/0247* | (2026.01) |
| *C21D 8/0278* | (2026.01) |
| *C21D 9/46* | (2006.01) |
| *C22C 18/00* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/08* | (2006.01) |
| *C22C 38/12* | (2006.01) |
| *C22C 38/14* | (2006.01) |
| *C22C 38/16* | (2006.01) |
| *C22C 38/18* | (2006.01) |
| *C22C 38/20* | (2006.01) |
| *C22C 38/26* | (2006.01) |
| *C22C 38/28* | (2006.01) |
| *C22C 38/32* | (2006.01) |
| *C22C 38/34* | (2006.01) |
| *C22C 38/38* | (2006.01) |
| *C22C 38/40* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/54* | (2006.01) |
| *C22C 38/60* | (2006.01) |
| *C23C 2/02* | (2006.01) |
| *C23C 2/06* | (2006.01) |
| *C23C 2/12* | (2006.01) |
| *C23C 2/28* | (2006.01) |
| *C23C 2/40* | (2006.01) |
| *C23C 30/00* | (2006.01) |

(52) U.S. Cl.
CPC ................ *B32B 15/18* (2013.01); *C21D 1/26*
(2013.01); *C21D 1/76* (2013.01); *C21D 3/04*
(2013.01); *C21D 8/0205* (2013.01); *C21D*
*8/0247* (2013.01); *C21D 8/0278* (2013.01);
*C21D 9/46* (2013.01); *C22C 18/00* (2013.01);
*C22C 38/001* (2013.01); *C22C 38/002*
(2013.01); *C22C 38/005* (2013.01); *C22C*
*38/02* (2013.01); *C22C 38/04* (2013.01); *C22C*
*38/06* (2013.01); *C22C 38/08* (2013.01); *C22C*
*38/12* (2013.01); *C22C 38/14* (2013.01); *C22C*
*38/16* (2013.01); *C22C 38/18* (2013.01); *C22C*
*38/20* (2013.01); *C22C 38/26* (2013.01); *C22C*
*38/28* (2013.01); *C22C 38/32* (2013.01); *C22C*
*38/34* (2013.01); *C22C 38/38* (2013.01); *C22C*
*38/40* (2013.01); *C22C 38/42* (2013.01); *C22C*
*38/44* (2013.01); *C22C 38/46* (2013.01); *C22C*
*38/48* (2013.01); *C22C 38/50* (2013.01); *C22C*
*38/54* (2013.01); *C22C 38/60* (2013.01); *C23C*
*2/02* (2013.01); *C23C 2/0224* (2022.08); *C23C*
*2/024* (2022.08); *C23C 2/06* (2013.01); *C23C*
*2/12* (2013.01); *C23C 2/28* (2013.01); *C23C*
*2/29* (2022.08); *C23C 2/40* (2013.01); *C23C*
*30/00* (2013.01); *C23C 30/005* (2013.01);
*B32B 2311/20* (2013.01); *Y10T 428/12611*
(2015.01); *Y10T 428/1266* (2015.01); *Y10T*
*428/12799* (2015.01); *Y10T 428/12951*
(2015.01); *Y10T 428/12972* (2015.01); *Y10T*
*428/27* (2015.01)

(58) Field of Classification Search
CPC .. C23C 2/29; C23C 2/40; C23C 30/00; C23C
30/005; B32B 15/013; B32B 15/04; B32B
15/043; B32B 15/18; B32B 2311/20;
C21D 1/26; C21D 1/76; C21D 3/04;
C21D 8/0205; C21D 8/0247; C21D
8/0278; C21D 9/46; C22C 18/00; C22C
38/001; C22C 38/002; C22C 38/005;
C22C 38/02; C22C 38/04; C22C 38/06;
C22C 38/08; C22C 38/12; C22C 38/14;
C22C 38/16; C22C 38/34; C22C 38/38;
C22C 38/42; C22C 38/44; C22C 38/46;
C22C 38/48; C22C 38/50; C22C 38/54;
C22C 38/58; C22C 38/60; C22C 38/18;
C22C 38/20; C22C 38/22; C22C 38/26;
C22C 38/28; C22C 38/32; C22C 38/40;
Y10T 428/12799; Y10T 428/1266; Y10T
428/12611; Y10T 428/12972; Y10T
428/12951; Y10T 428/27
See application file for complete search history.

(56) References Cited

FOREIGN PATENT DOCUMENTS

| | | | | |
|---|---|---|---|---|
| JP | 2014-58741 | A | 4/2014 | |
| WO | WO 2013/157222 | A1 | 10/2013 | |
| WO | WO 2014/054141 | A1 | 4/2014 | |
| WO | WO-2022097738 | A1 * | 5/2022 | ........... B32B 15/011 |

* cited by examiner

FIELD OF VISION

L

STEEL SHEET

LENGTH L$_0$ OF FIELD OF VISION

AFTER BRUSH GRINDING

L

STEEL SHEET

LENGTH L$_0$ OF FIELD OF VISION

BEFORE BRUSH GRINDING

STEEL SHEET AND PLATED STEEL SHEET

FIELD

The present invention relates to steel sheet and plated steel sheet. More specifically, the present invention relates to thin, high strength steel sheet and plated steel sheet excellent in plateability or chemical convertibility.

BACKGROUND

In recent years, the steel sheet used in automobiles, household electrical appliances, building materials, and various other fields has been made higher in strength. For example, in the automotive field, high strength steel sheet has been increasingly used for the purpose of lightening the weight of vehicle bodies for improvement of fuel economy. Such high strength steel sheet typically includes C, Si, Mn, and other elements for improving the strength of steel.

Such members account for the major part of the exteriors of automobiles, household electrical appliances, and building materials, therefore not only higher strength, but also excellent plateability or chemical convertibility is demanded.

If used for members for automotive use etc. in which use outdoors is particularly envisioned, high strength steel sheet is formed on its surface with a hot dip galvanized layer or a hot dip galvannealed layer or other plating layer from the viewpoint of improvement of the corrosion resistance etc. In general, before forming such a plating layer, the steel sheet (typically cold rolled steel sheet) is often annealed at a certain temperature or more so as to remove the strain from steel sheet and/or improve the workability.

In relation to this, hot dip galvanized steel sheet or hot dip galvannealed steel sheet containing C, Si, Mn, etc. as steel sheet constituents and suitably used mainly as members for automotive use and methods of production of the same are disclosed (for example, PTLs 1 to 4). Further, PTLs 1 to 4 teach that to produce the plated steel sheets described in in PTLs 1 to 4, the steel sheets are annealed or may be annealed before the plating step.

CITATIONS LIST

Patent Literature

[PTL 1] International Publication No. 2014/054141
[PTL 2] Japanese Unexamined Patent Publication No. 2014-058741
[PTL 3] International Publication No. 2013/157222
[PTL 4] Japanese Unexamined Patent Publication No. 2010-065269

SUMMARY

Technical Problem

Si and Mn, which are elements with strong affinity with oxygen among the elements typically included in high strength steel sheet, sometimes bond with the oxygen in the atmosphere in the annealing step and form a layer including oxides near the surface of the steel sheet. As the form of such a layer, one where the outside of the steel sheet (surface) is formed with a film of oxides containing Si or Mn (external oxidation) and one where the inside of the steel sheet (surface layer) is formed with oxides (internal oxidation) may be mentioned.

If the surface of the steel sheet where the external oxidation layer is formed is formed with a plating layer containing zinc (sometimes called a "zinc-based plating layer", for example, including a hot dip galvanized layer or a hot dip galvannealed layer), oxides will be present as a film on the surface of the steel sheet, therefore mutual diffusion of the steel constituents (for example, Fe) and plating constituents (for example, Zn) will be impeded. As a result, the reaction between the steel and plating layer will sometimes be detrimentally affected and the plateability will become insufficient (for example, unplated parts will increase). This being so, the plated steel sheet is liable to worsen in appearance properties and rust resistance. Further, these oxides also have an effect on the Fe—Zn reaction speed when alloying the plating layer. As a result, sometimes the plateability becomes insufficient (for example, uneven alloying occurs). In such a case as well, the plated steel sheet is liable to worsen in appearance properties. Accordingly, from the viewpoint of improving the plateability and obtaining plated steel sheet with good appearance properties, a steel sheet formed with an internal oxidation layer in which oxides are present inside is preferable over a steel sheet on which an external oxidation layer is formed.

On the other hand, under annealing conditions where an internal oxidation layer is formed, the phenomenon arises that not only is an internal oxidation layer formed, but also decarburization occurs near the surface of the steel sheet. "Decarburization" means the carbon near the surface of the steel sheet bonding with the oxygen in the annealing atmosphere to become $CO_2$ which is then discharged outside the system. A region where the carbon becomes insufficient is called a "decarburized layer". The carbon in the steel is an element contributing to the strength of the steel, therefore if the decarburized layer becomes thick, the strength near the steel sheet surface will fall. The drop in strength of the steel sheet surface due to the presence of such a decarburized layer does not particularly become a problem since the degree of the effect is relatively small when the thickness of the zinc-based plated steel sheet is great. However, in the case of a zinc-based plated steel sheet with a smaller thickness, the effect of the decarburization on a drop in strength (typically, a drop in tensile strength and a drop in fatigue characteristics) can no longer be ignored.

The present invention, in consideration of such a situation, has as its technical issue the provision of steel sheet and plated steel sheet with a small thickness of the steel sheet in which sufficient strength and plateability or chemical convertibility can both be achieved.

Solution to Problem

The inventors discovered that in steel sheet with a thickness of the steel sheet of 0.4 to 2.0 mm, by strictly controlling the ratio of the thickness of the decarburized layer of the steel sheet surface and the thickness of the steel sheet and the ratio of the C concentration at a specific position of the decarburized layer and the bulk C concentration of the steel sheet, it is possible to achieve both higher strength and high plateability or chemical convertibility.

The present invention was made based on the above discovery and has as its gist the following:

(1) A Steel sheet having a chemical composition containing, by mass %,

C: 0.05 to 0.30%,
Si: 0.01 to 2.50%,
Mn: 0.80 to 3.00%,
Al: 0.010 to 2.000%,

P: 0.1000% or less,
S: 0.1000% or less,
N: 0.0300% or less,
O: 0.010% or less,
B: 0 to 0.0100%,
Ti: 0 to 0.100%,
Nb: 0 to 0.100%,
V: 0 to 0.100%,
Cr: 0 to 1.00%,
Ni: 0 to 0.10%,
Cu: 0 to 0.10%,
Mo: 0 to 0.50%,
W: 0 to 0.50%,
Ca: 0 to 0.100%,
Mg: 0 to 0.100%,
Zr: 0 to 0.100%,
Hf: 0 to 0.100%, and
REM: 0 to 0.100% and
having a balance comprising Fe and impurities and
having a thickness of 0.4 to 2.0 mm,
in which steel sheet,
a tensile strength is 550 to 1500 MPa,
an internal oxidation layer and decarburized layer are contained,
when a thickness of the decarburized layer per side of the steel sheet: A (μm), a bulk C concentration of the steel sheet: Cb (%), and a thickness of the steel sheet: t (mm),
$0.01 \leq A/t \leq 0.15$, and
a C concentration at the ½A position is Cb/2 or more.

(2) The steel sheet according to (1), wherein the A/t is $0.04 \leq A/t \leq 0.15$.

(3) A plated steel sheet comprising the steel sheet according to (1) or (2) having a plating layer containing zinc on it.

(4) The plated steel sheet according to (3), wherein the plated steel sheet is a hot dip galvannealed steel sheet, the chemical composition of the plating layer contains Fe: 5 to 15% and Al: 0.01 to 0.5% and has a balance of Zn and impurities, and an amount of deposition per surface of the plating layer is 10 to 100 g/m².

Advantageous Effects of Invention

According to the present invention, it is possible to provide steel sheet having a thickness of 0.4 to 2.0 mm in which both sufficient strength and plateability or chemical convertibility can be achieved and possible to obtain thin, high strength plated steel sheet excellent in appearance properties.

DESCRIPTION OF EMBODIMENTS

Figure 1:
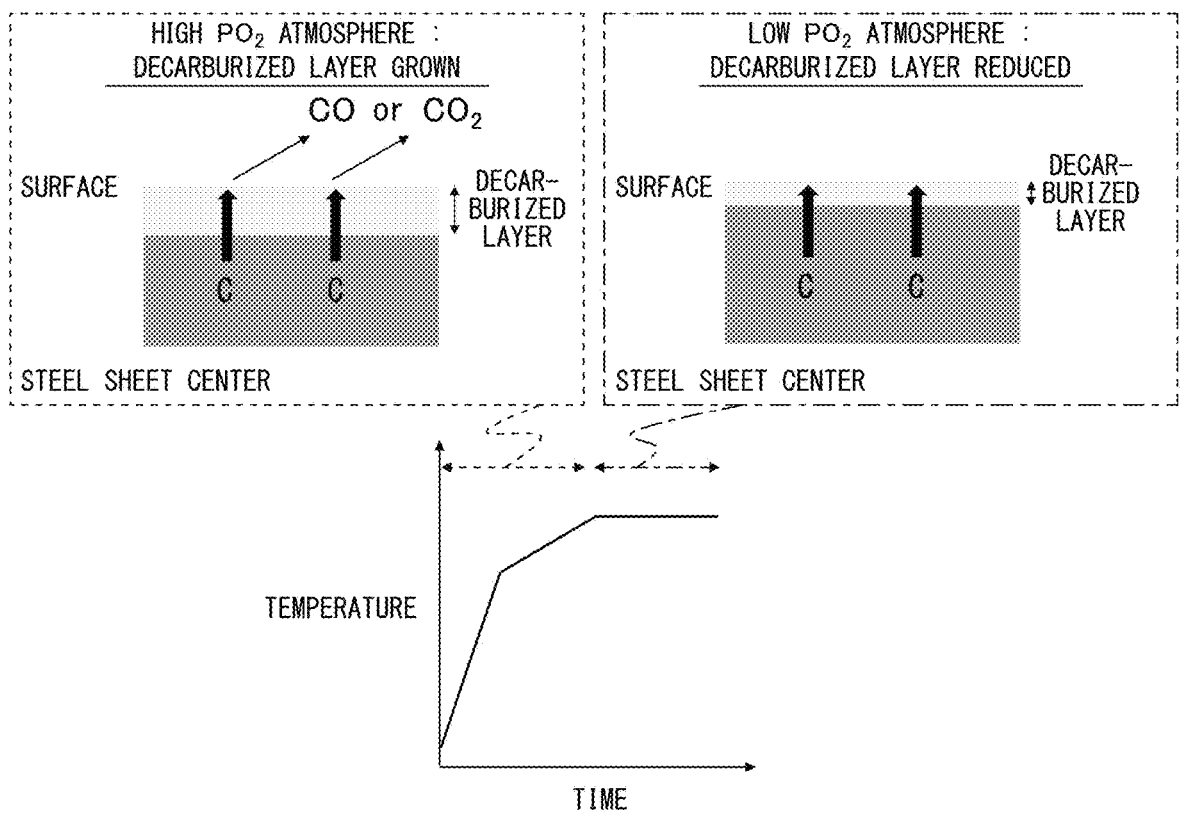
FIG. 1 is a view schematically showing behavior at a decarburized layer due to differences in annealing conditions.

Therefore, the inventors engaged in various studies for achieving both higher strength and high plateability or chemical convertibility in steel sheet having a 0.4 to 2.0 mm thickness and as a result discovered that adding C, Mn, Si, and Al in predetermined amounts or more to the steel and, further, giving the steel sheet surface an internal oxidation layer and decarburized layer and strictly controlling the ratio of thickness of the decarburized layer and the thickness of the steel sheet and C concentration in the decarburized layer is effective. More specifically, the inventors discovered that, when defining the thickness of the decarburized layer per surface of the steel sheet as A (μm), a bulk C concentration of the steel sheet as Cb (%), and a thickness of the steel sheet as "t" (μm), making A/t 0.01 to 0.15 in range and making the C concentration at a position of ½ of the thickness A of the decarburized layer Cb/2 or more are important for securing the plateability or chemical convertibility and strength.

Below, steel sheet according to the present invention will be explained in detail.

[Steel Sheet]

(Chemical Composition)

The chemical composition included in the steel sheet in the present invention will be explained. The "%" relating to the contents of the elements mean "mass % unless otherwise indicated. In a numerical range in a chemical composition, a numerical range expressed using "to", unless particularly indicated, means a range including the numerical values described before and after the "to" as the lower limit value and upper limit value.

(C: 0.05 to 0.30%)

C (carbon) is an important element in securing the strength of a zinc-based plated steel sheet. If the C content is insufficient, sufficient strength is liable to be unable to be secured. Therefore, the C content is 0.05% or more, preferably 0.07% or more, more preferably 0.08% or more, still more preferably 0.10% or more. On the other hand, if the C content is excessive, the strength becomes excessively high and the weldability and workability are liable to fall. Therefore, the C content is 0.30% or less, preferably 0.25% or less, more preferably 0.20% or less.

(Si: 0.01 to 2.50%)

Si (silicon) is an element effective for raising the strength of steel sheet. Further, Si is one of the elements bonding with oxygen during annealing and forming internal oxides. On the other hand, Si is also an element affecting the plateability and alloying speed. If the Si content is insufficient, internal oxidation is liable to not be able to be sufficiently caused. Therefore, the Si content is 0.01% or more, preferably 0.03% or more or 0.05% or more, more preferably 0.10% or more or 0.30% or more. On the other hand, if the Si content is excessive, deterioration of the surface properties is liable to be caused and lead to poor appearance. Further, an Si-based oxide film (external oxidation layer) is liable to be formed at the steel sheet surface. Therefore, the Si content is 2.50% or less, preferably 2.00% or less, more preferably 1.50% or less.

(Mn: 0.80 to 3.00%)

Mn (manganese) is an element effective for obtaining hard structures and thereby raising the strength of steel sheet. Further, Mn is also one of the elements bonding with oxygen during annealing and forming internal oxides. If the Mn content is insufficient, sufficient strength is liable to be unable to be secured. Therefore, the Mn content is 0.80% or more, preferably 1.00% or more, more preferably 1.20% or more. On the other hand, if excessively adding Mn, Mn segregation is liable to cause the metallographic structure to become uneven and the workability to fall. Therefore, the Mn content is 3.00% or less, preferably 2.80% or less, more preferably 2.50% or less.

(Al: 0.010 to 2.000%)

Al (aluminum) is an element acting as a deoxidizing element. If the Al content is less than 0.010%, sometimes it is not possible to sufficiently obtain the effect of deoxidation. Therefore, the Al content is 0.010% or more, preferably 0.100% or more, more preferably 0.200% or more. On the other hand, if excessively containing Al, a drop in workability and deterioration of the surface properties are liable to be caused. Therefore, the Al content is 2.000% or less, preferably 1.500% or less, more preferably 1.000% or less.

(P: 0.1000% or Less)

P (phosphorus) is an impurity generally contained in steel. With a P content of more than 0.1000%, the weldability is liable to fall. Therefore, the P content is 0.1000% or less, preferably 0.0800% or less, more preferably 0.0500% or less, still more preferably 0.0200% or less. The lower limit of the P content is not particularly prescribed, but from the viewpoint of the production costs, the P content may also be more than 0% or 0.0010% or more.

(S: 0.1000% or Less)

S (sulfur) is an impurity generally contained in steel. With an S content of more than 0.1000%, the weldability falls and further the amount of precipitation of the MnS increases and the bendability and other workability are liable to fall. Therefore, the S content is 0.1000% or less, preferably 0.0800% or less, more preferably 0.0500% or less, still more preferably 0.0200% or less. The lower limit of the S content is not particularly prescribed, but from the viewpoint of the desulfurization costs, the S content may also be more than 0% or 0.0010% or more.

(N: 0.0300% or Less)

N (nitrogen) is an impurity generally contained in steel. With an N content of more than 0.0300%, the weldability is liable to fall. Therefore, the N content is 0.0300% or less, preferably 0.0200% or less, more preferably 0.0100% or less, still more preferably 0.0050% or less. The lower limit of the N content is not particularly prescribed, but from the viewpoint of the production costs, the N content may also be more than 0% or 0.0010% or more.

(O: 0.010% or Less)

O (oxygen) is an impurity generally contained in steel. With an O content of more than 0.010%, deterioration of the ductility is liable to be invited. Therefore, the O content is 0.010% or less, preferably 0.008% or less, more preferably 0.006% or less, still more preferably 0.005% or less. The lower limit of the O content is not particularly prescribed, but from the viewpoint of the production costs, the O content may also be more than 0% or 0.001% or more.

The steel sheet in the present invention may contain the optional elements explained below as necessary in addition to the elements explained above.

(B: 0 to 0.0100%)

B (boron) is an element raising the hardenability and contributing to improvement of the strength and, further, segregating at the grain boundaries to strengthen the grain boundaries and improve the toughness, therefore may be contained in accordance with need. Therefore, the B content is 0% or more, preferably 0.0001% or more, more preferably 0.0010% or more, still more preferably 0.0020% or more. On the other hand, from the viewpoint of securing sufficient toughness and weldability, the B content is 0.0100% or less, preferably 0.0090% or less, more preferably 0.0080% or less.

(Ti: 0 to 0.100%)

Ti (titanium) is an element precipitating as TiC while the steel is being cooled and contributing to improvement of the strength, therefore may be contained in accordance with need. Therefore, the Ti content is 0% or more, preferably 0.001% or more, more preferably 0.010% or more, still more preferably 0.020% or more. On the other hand, if excessively contained, coarse TiN is liable to be formed and the toughness to be impaired, therefore the Ti content is 0.100% or less, preferably 0.090% or less, more preferably 0.080% or less.

(Nb: 0 to 0.100%)

Nb (niobium) is an element forming NbC in steel, having the effect of making the crystal grains finer, and improving the strength, therefore may be contained in accordance with need. Therefore, the Nb content is 0% or more, preferably 0.001% or more, more preferably 0.010% or more, still more preferably 0.020% or more. On the other hand, from the viewpoint of securing sufficient toughness and weldability, the Nb content is 0.100% or less, preferably 0.090% or less, more preferably 0.080% or less.

(V: 0 to 0.100%)

V (vanadium) is an element forming VC and contributing to improvement of the strength, therefore may be contained in accordance with need. Therefore, the V content is 0% or more, preferably 0.010% or more, more preferably 0.020% or more, still more preferably 0.030% or more. On the other hand, from the viewpoint of securing sufficient toughness and weldability, the V content may also be 0.100% or less, preferably 0.090% or less, more preferably 0.080% or less and less than 0.015% or 0.010% or less.

(Cr: 0 to 1.00%)

Cr (chromium) is an element contributing to improvement of the strength of the steel and corrosion resistance, therefore may be contained in accordance with need. Therefore, the Cr content is 0% or more, preferably 0.01% or more, more preferably 0.05% or more, still more preferably 0.10% or more. On the other hand, if excessively contained, Cr carbides are formed in large amounts and conversely the hardenability is liable to be impaired, therefore the Cr content is 1.00% or less, preferably 0.90% or less, more preferably 0.80% or less, still more preferably 0.60% or less.

(Ni: 0 to 0.10%)

Ni (nickel) is an element contributing to improvement of the strength of the steel and corrosion resistance, therefore may be contained in accordance with need. Therefore, the Ni content is 0% or more, preferably 0.01% or more, more preferably 0.02% or more. On the other hand, from the viewpoint of the production costs etc. the Ni content is 0.10% or less, preferably 0.08% or less.

(Cu: 0 to 0.10%)

Cu (copper) is an element contributing to improvement of the strength of the steel and corrosion resistance, therefore may be contained in accordance with need. Therefore, the Cu content is 0% or more, preferably 0.01% or more, more preferably 0.02% or more. On the other hand, from the viewpoint of suppressing a drop in toughness, fracture of the slab after casting, and a drop in the weldability, the Cu content is 0.10% or less, preferably 0.08% or less.

(Mo: 0 to 0.50%)

Mo (molybdenum) is an element contributing to improvement of the strength of the steel and corrosion resistance, therefore may be contained in accordance with need. Therefore, the Mo content is 0% or more, preferably 0.01% or more, more preferably 0.10% or more. On the other hand, from the viewpoint of securing sufficient toughness and weldability, the Mo content is 0.50% or less, preferably 0.40% or less, more preferably 0.30% or less.

(W: 0 to 0.50%)

W (tungsten) is effective for raising the strength of steel, therefore may be contained in accordance with need. Therefore, the W content is 0% or more, preferably 0.01% or more, more preferably 0.05% or more, still more preferably 0.10% or more. On the other hand, from the viewpoint of suppressing a drop in the toughness and weldability, the W content is 0.50% or less, preferably 0.40% or less, more preferably 0.30% or less.

(Ca: 0 to 0.100%)

Ca (calcium) is an element contributing to control of inclusions, in particular fine dispersion of inclusions, and having the action of raising toughness, therefore may be contained in accordance with need. Therefore, the Ca content is 0% or more, preferably 0.001% or more, more preferably 0.005% or more, still more preferably 0.010% or more, furthermore preferably 0.020% or more. On the other hand, if excessively contained, sometimes the surface properties start to remarkably deteriorate, therefore the Ca content is 0.100% or less, preferably 0.080% or less, more preferably 0.050% or less.

(Mg: 0 to 0.100%)

Mg (magnesium) is an element contributing to control of inclusions, in particular fine dispersion of inclusions, and having the action of raising toughness, therefore may be contained in accordance with need. Therefore, the Mg content is 0% or more, preferably 0.001% or more, more preferably 0.003% or more, still more preferably 0.010% or more. On the other hand, if excessively contained, sometimes the surface properties start to remarkably deteriorate, therefore the Mg content is 0.100% or less, preferably 0.090% or less, more preferably 0.080% or less.

(Zr: 0 to 0.100%)

Zr (zirconium) is an element contributing to control of inclusions, in particular fine dispersion of inclusions, and having the action of raising toughness, therefore may be contained in accordance with need. Therefore, the Zr content is 0% or more, preferably 0.001% or more, more preferably 0.005% or more, still more preferably 0.010% or more. On the other hand, if excessively contained, sometimes the surface properties start to remarkably deteriorate, therefore the Zr content is 0.100% or less, preferably 0.050% or less, more preferably 0.030% or less.

(Hf: 0 to 0.100%)

Hf (hafnium) is an element contributing to control of inclusions, in particular fine dispersion of inclusions, and having the action of raising toughness, therefore may be contained in accordance with need. Therefore, the Hf content is 0% or more, preferably 0.001% or more, more preferably 0.005% or more, still more preferably 0.010% or more. On the other hand, if excessively contained, sometimes the surface properties start to remarkably deteriorate, therefore the Hf content is 0.100% or less, preferably 0.050% or less, more preferably 0.030% or less.

(REM: 0 to 0.100%)

REM (rare earth metals) are elements contributing to control of inclusions, in particular fine dispersion of inclusions, and having the action of raising toughness, therefore may be contained in accordance with need. Therefore, the REM content is 0% or more, preferably 0.001% or more, more preferably 0.005% or more, still more preferably 0.010% or more. On the other hand, if excessively contained, sometimes the surface properties start to remarkably deteriorate, therefore the REM content is 0.100% or less, preferably 0.050% or less, more preferably 0.030% or less. It should be noted that "REM" is an abbreviation for rare earth metals and means elements belonging to the lanthanoids. REM are usually added as mischmetal.

In the present invention, the steel sheet may contain, from among the above optional elements, one or more of B: 0.0001 to 0.0100%, Ti: 0.001 to 0.100%, Nb: 0.001 to 0.100%, Cr: 0.01 to 1.00%, Mo: 0.01 to 0.50%, and W: 0.01 to 0.50%. Alternatively or additionally, the steel sheet may contain one or more of V: 0.010 to 0.100%, Ni: 0.01 to 0.10%, Cu: 0.01 to 0.10%, Ca: 0.001 to 0.100%, Mg: 0.001 to 0.100%, Zr: 0.001 to 0.100%, Hf: 0.001 to 0.100%, and REM: 0.001 to 0.100%.

In the steel sheet in the present invention, the balance other than the above constituents is further comprised of Fe and impurities. In this case, "impurities" mean constituents entering due to various factors in the production process, first and foremost, materials like ore, scrap, etc. when industrially producing steel sheet and allowed to be contained to an extent not detrimentally affecting the properties of the steel sheet according to the present invention.

The chemical composition of the steel sheet may be analyzed by any chemical analysis known to persons skilled in the art. For example, it is analyzed by inductively coupled plasma-mass spectrometry (ICP-MS). However, C and S may be measured using the combustion-infrared absorption method, while N may be measured using the inert gas melting-thermal conductivity method. These analyses may be performed by samples obtained by taking specimens from the steel sheet by a method based on JIS G0417: 1999.

(Thickness and Width of Steel Sheet)

The present invention covers steel sheet having a 0.4 to 2.0 mm thickness and plated steel sheet using the same. More specifically, for example, it covers steel sheet having a 0.4 to 2.0 mm thickness and plated steel sheet using the same which can be suitably used for doors, hoods, roofs, or other members of automobiles. From the viewpoint of securing the strength, the thickness of the steel sheet may preferably be 0.4 mm or more, more preferably 0.5 mm or more. In the sense of lightening the weight, the less the thickness the better. Preferably, it is 1.9 mm or less, more preferably 1.7 mm or less, still more preferably 1.5 mm or less. Further, the plated steel sheet according to the present invention is suitably used in particular for doors, hoods, roofs, or other members of automobiles, therefore the width of the plated steel sheet (i.e., steel sheet) is typically 1000 mm or more and, in some case, is 1500 mm or more. The thickness of the steel sheet may be found using a micrometer, etc. When measuring the thickness of a sheet sheet after removing a plating layer from a plated steel sheet, the plating layer may be removed and a micrometer etc. used for measurement or it may be found from examination of the cross section. The width of the steel sheet may be directly measured by a long ruler, tape measure, etc.

(Internal Oxidation Layer)

The steel sheet according to the present invention has an internal oxidation layer including oxides at the surface layer of the steel sheet (inside of steel sheet). The oxides of the internal oxidation layer include, in addition to oxygen, one or more of the above elements included in the steel sheet. Typically, they have a chemical composition containing Si, O, Fe, and Mn and further, in some cases, Al. Typically, the oxides have compositions of $Mn_2SiO_4$ or $SiO_2$, MnO, etc. In the steel sheet according to the present invention, rather than a film-like layer of oxides being formed on the external oxidation layer, i.e., the surface of the steel sheet, a layer in which oxides are present is formed at an internal oxidation layer, i.e., the inside of the steel sheet, therefore if forming a plating layer, mutual diffusion of the steel constituents (for example, Fe) and plating constituents (for example, Zn) occurs well, a plating layer (for example, plating layer containing zinc (zinc-based plating layer)) is formed well on the steel sheet, unplated parts etc. are not formed, and a plated steel sheet excellent in appearance properties (for example, a plated steel sheet having a plating layer containing zinc (zinc-based plated steel sheet)) can be obtained. Further, if alloying, uneven alloying can be suppressed and a plated steel sheet excellent in appearance properties (for example, a plated steel sheet having a plating layer containing zinc (zinc-based plated steel sheet)) can be obtained. Similarly, in the steel sheet according to the present invention, a chemical conversion coating can be formed well on the steel sheet. It should be noted that, to secure plateability or chemical convertibility, it was sufficient that a fixed amount of the internal oxidation layer can be formed. Rather, if forming the internal oxidation layer thick, the decarburized layer causing a drop of strength also becomes thicker, therefore excessive formation of the internal oxidation layer is not preferable. For example, the thickness per surface of the internal oxidation layer may be 0.01 to 0.20 times or so the thickness of the steel sheet. The thickness of the internal oxidation layer per surface of the steel sheet in the present invention is not particularly limited, but, for example, may be 4.0 μm or more, 5.0 μm or more, 6.0 μm or more, or 7.0 μm or more. The upper limit of thickness of the internal oxidation layer is not particularly prescribed, but from the viewpoint of suppressing excessive formation of the decarburized layer, may be for example, 50.0 μm or less, 40.0 μm or less, 30.0 μm or less, or 20.0 μm or less.

(Decarburized Layer)

The steel sheet according to the present invention has a decarburized layer near the surface of the steel sheet. The decarburized layer has a lower carbon concentration compared with the carbon concentration at the important part of the steel sheet (for example, the center part in thickness). In the present invention, the "decarburized layer" is a region present from the surface of the steel sheet (in the case of a plated steel sheet, the interface of the steel sheet and zinc-based plating layer) to the inside of the steel sheet in which the carbon concentration becomes lower compared with the bulk carbon concentration of the steel sheet. Further, in the steel sheet according to the present invention, as explained later, the thickness of the decarburized layer is controlled with respect to the thickness of the steel sheet, therefore a drop in strength of the steel sheet due to the presence of the decarburized layer can be suppressed and the plateability or chemical convertibility can be secured while achieving higher strength. The thickness A (μm) of the decarburized layer in the present invention is preferably small from the viewpoint of securing higher strength. However, the decarburized layer is formed to some extent together with the internal oxidation layer, therefore while not particularly limited. A is substantially 4.0 μm or more, for example, may be 10.0 μm or more, 15.0 μm or more, 20.0 μm or more, 25.0 μm or more, 30.0 μm or more, or 40.0 μm or more. From the viewpoint of securing higher, in particular higher and more uniform, strength, the upper limit of A is preferably 200.0 μm or less, more preferably 150.0 μm or less or 120.0 μm or less, still more preferably 100.0 μm or less or 90.0 μm or less.

(B/A: 0.01 to 0.50)

In the steel sheet according to the present invention, to obtain a high plateability or chemical convertibility, it is necessary to form an internal oxidation layer. On the other hand, to obtain a high strength, it is preferable to suppress the formation of a decarburized layer. Therefore, it is preferable to secure the thickness B (μm) per surface of the internal oxidation layer to a certain extent while making the thickness A (μm) per surface of the decarburized layer smaller. Accordingly, in the present invention, the lower limit of B/A may be made 0.01. By B/A being 0.01 or more, it becomes easier for both higher strength and high plateability or chemical convertibility to be achieved. If B/A becomes less than 0.01, the internal oxidation layer is not sufficiently formed and the plateability or chemical convertibility falls and/or the decarburized layer is liable to become thicker and the strength to become insufficient. The lower limit of B/A is preferably 0.03 or 0.05, more preferably 0.10 or 0.15, still more preferably 0.20. On the other hand, under conditions where usually internal oxidation occurs, the thickness A of the decarburized layer becomes greater than the thickness B of the internal oxidation layer, therefore the upper limit of B/A may substantially be made 0.50. The upper limit of B/A may be less than 0.50, 0.45, 0.40, or 0.30. It should be noted that, from the viewpoint of securing strength, the decarburized layer is preferably thin, but for securing plateability or chemical convertibility, some of it is formed when forming the internal oxidation layer, therefore in the present invention, the thickness A per surface of the decarburized layer does not become 0). It should be noted that B means the thickness of the internal oxidation layer per surface of the steel sheet.

(A/t: 0.01 to 0.15)

Further, in the zinc-based plated steel sheet according to the present invention, to suppress the formation of the decarburized layer and realize higher strength, it is preferable to make the thickness A (μm) per surface of the decarburized layer smaller compared with the thickness "t" (mm) of the steel sheet. In particular, the thickness of the steel sheet of the present invention is a thin 0.4 to 2.0 mm (400 to 2000 μm), therefore such control is extremely important. Accordingly, in the present invention, the upper limit of A/t is made 0.15. By A/t being 0.15 or less, the effect of the drop of strength due to the presence of the decarburized layer can be suppressed and a steel sheet having sufficient strength can be obtained. If A/t is more than 0.15, the decarburized layer becomes thicker than the thickness of the steel sheet and the strength is liable to become insufficient. In general, the smaller A/t, the more possible it is to suppress the effect of the drop of strength and the easier it becomes to obtain a steel sheet having sufficient strength. For this reason, preferably the upper limit of A/t may be 0.14, 0.13, 0.12, 0.11, or 0.10. On the other hand, in the present invention, to secure the plateability or chemical convertibility, an internal oxidation layer has to be formed to a certain extent of thickness, therefore a decarburized layer is also somewhat formed. Accordingly, the lower limit of A/t becomes substantially 0.01. In general, the larger the A/t, the easier it is for a decarburized layer and an internal oxidation layer to be formed and the easier it is for the plateability or chemical convertibility to be secured. For this reason, preferably the lower limit of A/t may be 0.02, 0.03, 0.04, 0.05, or 0.06. It should be noted that A means the thickness of the decarburized layer per surface of the steel sheet. That is, when A affects the strength of a steel sheet, the two sides of the steel sheet are affected.

(Measurement of Thickness A (μm) of Decarburized Layer)

The thickness A (μm) of the decarburized layer is measured as follows: The steel sheet to be measured is analyzed for the composition of the steel sheet in the thickness direction by a glow discharge optical emission spectrometer (GDS) and evaluated for the thickness of the decarburized layer. If a plated steel sheet is measured, the plating layer is chemically dissolved and removed by hydrochloric acid to which an inhibitor is added etc., then the evaluation is conducted. Specifically, the sputter depth after sputtering from the steel sheet surface toward the thickness direction of the steel sheet for a certain time is measured by a roughness meter, laser microscope, or other means and the sputter speed per time is calculated. In this case, if C (carbon) is removed, the profile of C concentration falls from the C signal intensity of the steel base material near the surface of the steel sheet. If proceeding in the direction inside of sheet thickness, the intensity gradually increases and reaches the C signal intensity of the steel base material. In the present invention, the position at which the C signal intensity of the steel base material is identified and the value of the sputter time when reaching that position converted to depth by the sputter speed is deemed the thickness of the decarburized layer. That is, in the present invention, the "decarburized layer" means the region from the surface of the steel sheet to where the C concentration becomes the C concentration of the steel base material by measurement by a glow discharge optical emission spectroscope (GDS) (i.e., the bulk C concentration of the steel sheet, also called Cb). The above operation is performed at three locations and the thicknesses found at the locations are averaged to thereby obtain the thickness A ($\mu$m) per surface of the decarburized layer at the present invention. For the GDS, a high frequency type is used.

(Measurement of Thickness B ($\mu$m) of Internal Oxidation Layer)

The thickness B ($\mu$m) of the internal oxidation layer is measured as follows: The steel sheet to be measured is analyzed for the composition of the steel sheet in the thickness direction by a glow discharge optical emission spectrometer (GDS) and evaluated for the thickness of the internal oxidation layer. If a plated steel sheet is measured, the plating layer is chemically dissolved and removed by hydrochloric acid to which an inhibitor is added etc., then the evaluation is conducted. Specifically, the sputter depth after sputtering from the steel sheet surface toward the thickness direction of the steel sheet for a certain time is measured by a roughness meter, laser microscope, or other means and the sputter speed per time is calculated. In this case, if Mn internally oxidizes, the profile of Mn concentration falls once from the Mn signal intensity of the steel base material, then gradually increases and reaches the Mn signal intensity of the steel base material. In the present invention, the position where reaching the Mn signal intensity of 0.9 time the Mn signal intensity of the steel base material is defined as the internal oxidation position. The value of the sputter time when reaching this internal oxidation position converted to thickness by the sputter speed is made the thickness of the internal oxidation layer. That is, in the present invention, the "internal oxidation layer" means a region where the Mn concentration becomes 0.9 time or less of the Mn concentration of the steel base material by measurement by a glow discharge optional emission spectroscope (GDS). By performing the above operation at three locations or more and averaging the thicknesses of the internal oxidation layers found at those locations, the thickness B ($\mu$m) per surface of the internal oxidation layer in the present invention is obtained. For GDS, a high frequency type can be used.

(C Concentration at ½A Position of Cb/2 or More)

Figure 2:
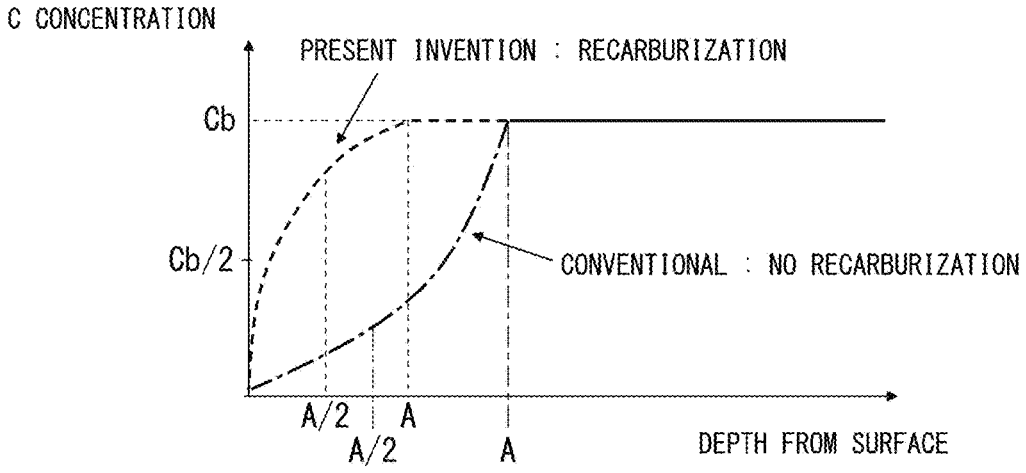
FIG. 2 is a view schematically showing a C profile near a surface of a steel sheet due to any recarburization.

In the decarburized layer of the steel sheet according to the present invention, by managing the annealing conditions in the later explained annealing step, it is possible to control the C concentration in the decarburized layer and realize higher strength of the steel sheet. Specifically, by management of the annealing conditions, it is possible to make C diffuse from inside the steel to the C-poor decarburized layer, reduce the thickness of the decarburized layer, and raise the C concentration in the decarburized layer. This phenomenon is called "recarburization". FIG. 1 is a view schematically showing the behavior at the decarburized layer due to differences in annealing conditions. At the top left of FIG. 1, the annealing atmosphere is a high oxygen partial pressure (high $P_{O2}$). If oxygen (O) is supplied to the steel sheet, an internal oxidation layer is formed, further, $CO_2$ or CO bonded with the carbon (C) inside the steel sheet is discharged into the atmosphere, and formation of a decarburized layer is promoted. On the other hand, at the top right of FIG. 1, the annealing atmosphere is a low oxygen partial pressure (low $P_{O2}$). Oxygen (O) is not sufficiently supplied, carbon (C) diffused from inside the steel does not form $CO_2$ or CO, the thickness of the decarburized layer is reduced, and the C concentration in the decarburized layer becomes higher. For this reason, in the decarburized layer in the present invention, the carbon (C) concentration at a position of ½ of the thickness A of the decarburized layer is ½ or more of the bulk C concentration Cb of the steel sheet. FIG. 2 is a view schematically showing the C profile near the surface of the steel sheet due to any presence of recarburization. Regardless of any presence of recarburization, the C concentration decreases from the bulk C concentration Cb of the deep part of the steel sheet toward the steel sheet surface, but if there is recarburization, compared with no recarburization, the thickness of the decarburized layer is decreased and the C concentration in the decarburized layer is high. For this reason, the drop in strength near the surface of the steel sheet with a decarburized layer is suppressed and the strength of the steel sheet as a whole can be raised. It should be noted that the C concentration is measured by the above-mentioned glow discharge optional emission spectroscope (GDS).

(Tensile Strength)

The steel sheet according to the present invention has a 550 to 1500 MPa tensile strength. By the tensile strength being 550 MPa or more, the strength can be sufficiently secured. For example, if used for a member for an automobile, it is possible to achieve lighter weight by reducing the thickness. The tensile strength is preferably 580 MPa or more or 600 MPa or more, more preferably 620 MPa or more, still more preferably 650 MPa or more, most preferably 700 MPa or more. On the other hand, if the tensile strength becomes higher, the workability is liable to fall, therefore the tensile strength may be made 1500 MPa or less, 1400 MPa or less, or 1300 MPa or less. The tensile test is performed using a JIS No. 5 tensile test piece by the method prescribed in JIS-Z2241: 2011. The crosshead test speed of the tensile test is made 30 mm/min.

(Fatigue Characteristics)

The steel sheet according to the present invention is kept from being excessively decarburized and can give high fatigue characteristics. The fatigue characteristics are evaluated by performing a planar bending fatigue test based on JIS Z 2275:1978 using the steel sheet to be measured, finding the fatigue limit ratio (=fatigue strength/tensile strength), and using that fatigue limit ratio. By the fatigue limit ratio being 0.40 or more even if a load is repeatedly given over a long period, a certain strength is secured and, for example, use is possible as a member suitable for fields in which long term reliability is demanded, such as members for automobiles.

<Plated Steel Sheet Having Plating Layer Containing Zinc>

Below, a plated steel sheet having a plating layer containing zinc according to an embodiment of the present invention (below, sometimes referred to as a "zinc-based plated steel sheet" or simply a "plated steel sheet") will be explained in detail.

The plated steel sheet according to the present invention has a steel sheet and a plating layer containing zinc formed on at least one surface of that steel sheet (below, sometimes referred to as a "zinc-based plating layer" or simply a "plating layer"). Accordingly, the zinc-based plating layer may be formed on one surface of the steel sheet or may be formed on both surfaces. Further, in the present invention, it is sufficient that the zinc-based plating layer be formed on the steel sheet. Another plating layer may also be provided between the steel sheet and the zinc-based plating layer. The "zinc-based plating layer", as explained above, means a plating layer containing zinc. For example, it means a hot dip galvanized layer and a hot dip galvannealed layer.

[Plating Layer Containing Zinc (Zinc-Based Plating Layer)]

The zinc-based plating layer in the present invention is formed on at least one surface on the steel sheet. The "zinc-based plating layer" typically means a plating layer mainly (i.e., more than 50%) comprised of Zn, but includes a layer where heat treatment (for example, alloying) etc. performed after plating causes the constituents in the steel to diffuse and as a result the Zn to become 50% or less. The zinc-based plating layer can be formed by various methods, but preferably hot dip galvanization is performed. Further, from the viewpoint of improving the weldability and/or coatability, alloying after hot dip galvanization is more preferable. Accordingly, the zinc-based plated steel sheet according to the present invention is preferably hot dip galvanized steel sheet, more preferably hot dip galvannealed steel sheet. In the present invention, the surface layer of the steel sheet is formed with not an external oxidation layer, but an internal oxidation layer, therefore the zinc-based plating layer can, for example, be formed in a state suppressing unplated parts and, in the case of alloying, be formed in a state suppressing uneven alloying.

(Chemical Composition of Plating Layer Containing Zinc (Zinc-Based Plating Layer))

A preferable chemical composition contained in the zinc-based plating layer in the present invention will be explained, but the zinc-based plating layer is not particularly limited in chemical composition so long as it is a plating layer containing Zn. Typically, the zinc-based plating layer contains 50 mass % or more of Zn. Below, the "%" relating to the contents of elements, unless otherwise indicated, mean "mass %". In a numerical range in a chemical composition, a numerical range expressed using "to", unless particularly indicated, means a range including the numerical values described before and after the "to" as the lower limit value and upper limit value.

(Fe: 0 to 15%)

Fe can be included in the plating layer by diffusion from the steel sheet in the case of forming a plating layer containing Zn on the steel sheet, then heat treating the plated steel sheet. Therefore, the lower limit of the Fe content may also be 0%. If performing alloying for forming a hot dip galvannealed layer, the Fe in the steel diffuses in the plating layer, therefore in this case the lower limit value of the Fe content may be 1%, preferably 3%, more preferably 5%. On the other hand, the upper limit value of the Fe content may be 15%, preferably is 12%, more preferably is 10%. Accordingly, for example, if the zinc-based plating layer is a hot dip galvannealed layer, the Fe content in the plating layer may also be 5 to 15%.

(Al: 0 to 30%)

Al is an element which improves the corrosion resistance of the plating layer by being contained or alloyed together with Zn, therefore may be contained in accordance with need. Therefore, for example, if forming the plating layer by electrogalvanization, the Al content may also be 0%. To form a plating layer containing Zn and Al, preferably the Al content may be 0.01% or more, for example, may be 0.1% or more or 0.5% or more. On the other hand, if more than 30%, the effect of improving the corrosion resistance becomes saturated, therefore the Al content may be 30% or less, for example, may be 20% or less, 10% or less, 5% or less, 1% or less, or 0.5% or less. Even if the plating bath does not contain Al, if performing alloying for forming a hot dip galvannealed layer, the Al in the steel diffuses in the plating layer. Accordingly, in this case, for example, the Al content may also be 0.01 to 0.5%.

The basic chemical composition of the zinc-based plating layer is as explained above. Furthermore, the zinc-based plating layer, in particular a hot dip galvannealed layer, may optionally contain the elements included in the steel explained above or other elements. These optional elements are not particularly limited, but from the viewpoint of enabling the actions and functions of the basic constituents forming the plating layer to be sufficiently manifested, the total content is preferably made 5% or less, more preferably is 2% or less.

In the zinc-based plating layer in the present embodiment, the balance other than the above chemical composition is comprised of Zn and impurities. In this case, the "impurities" in the zinc-based plating layer mean constituents entering due to various factors in the production process, such as first and foremost the raw materials, when producing the plating layer and not constituents intentionally added to the plating layer. In the plating layer, as impurities, elements other than the above explained basic constituents and optional constituents may be contained in trace amounts to an extent not interfering with the effect of the present invention.

(Amount of Deposition Per Surface)

The amount of deposition of the zinc-based plating layer in the present embodiment is not particularly limited, but, for example, can be 10 to 100 g/m². The amount of plating deposition per surface greatly affects the corrosion resistance. The lower limit value of the amount of deposition, from the viewpoint of corrosion resistance, is preferably 15 g/m², more preferably 20 g/m², still more preferably 30 g/m². On the other hand, the upper limit value of the amount of deposition per surface, from the viewpoints of shapeability, weldability, and economy, is preferably 90 g/m², more preferably 70 g/m², still more preferably 60 g/m².

The chemical composition and amount of deposition of the zinc-based plating layer can be obtained by inductively coupled plasma (ICP) optical emission spectroscopy. Specifically, the chemical composition and amount of deposition of the zinc-based plating layer can be found by dissolving only the plating layer from the zinc-based plated steel sheet having the zinc-based plating layer and analyzing the obtained solution by ICP. It should be noted that the amount of plating deposition in the present invention is the amount per surface, therefore if both surfaces of the steel sheet are formed with zinc-based plating layers, the amounts of plating deposition of the two surfaces are calculated assuming them to be the same.

<Method of Production of Steel Sheet>

Below, a preferable method of production of the steel sheet according to the present invention will be explained. The following explanation is intended to illustrate the characteristic method for producing the steel sheet according to the present invention and is not intended to limit the steel sheet to one produced according to the method of production explained below.

[Fabrication of Steel Sheet]

The steel sheet in the present invention can be obtained by a casting step of casting molten steel adjusted in chemical composition to form a steel slab, a hot rolling step of hot rolling the steel slab to obtain a hot rolled steel sheet, a pickling step of removing the surface oxides (scale) and preferably internal oxidation layer formed in the hot rolling step, a cold rolling step of cold rolling to obtain a cold rolled steel sheet, a grinding step of grinding the cold rolled steel sheet, and an annealing step of annealing the cold rolled steel sheet.

(Casting Step)

The conditions of the casting step are not particularly limited. For example, after the melting in the blast furnace, electric furnace, etc., it is possible to perform various secondary refining operations, then cast by usual continuous casting, casting by the ingot method, thin slab casting, or other method. Scrap may be used for the materials, but the amount of scrap used is adjusted so that the contents of the elements of the obtained steel sheet satisfy the above ranges.

(Hot Rolling Step)

The steel slab cast in the above way can be hot rolled to obtain a hot rolled steel sheet. The hot rolling step is performed by directly hot rolling the cast steel slab or cooling it once, then reheating and hot rolling it. If reheating, the heating temperature of the steel slab may, for example, be 1100° C., to 1250° C. In the hot rolling step, usually rough rolling and finish rolling are performed. The temperatures and rolling reductions of the rolling operations may be suitably determined in accordance with the desired metallographic structure and sheet thickness. For example, the finish rolling temperature may be made 800 to 1050° C., and the rolling reduction of the finish rolling may be made 50 to 80%. In the present invention, the load at the cold rolling step to finally reduce the thickness of the steel sheet to 0.4 to 2.0 mm is large. For this reason, it is preferable to set the rolling reduction at the hot rolling a bit higher so as to reduce the sheet thickness at the time of hot rolling as much as possible. Specifically, it is preferable to make the sheet thickness after hot rolling 2.5 mm or less. However, the thicknesses of the internal oxidation layer and decarburized layer formed near the surface of the steel sheet at the hot rolling are substantially constant, therefore if making the sheet thickness after hot rolling thinner, the effects of the internal oxidation and decarburization at the hot rolling become relatively large. On the other hand, for example, if the internal oxidation layer and decarburized layer formed at the hot rolling step are not sufficiently removed by the subsequent pickling step and grinding step and end up remaining in relatively large amounts, at the annealing step, the internal oxidation layer and decarburized layer will not be formed well or will end up being formed unevenly— which is not desirable. Therefore, to suppress the formation of the internal oxidation layer and decarburized layer at the hot rolling step to reduce the effects of internal oxidation and decarburization at the hot rolling, the coiling temperature is preferably made 600° C., or less, more preferably 550° C., or less.

(Pickling Step)

The pickling step is performed for removing the surface scale formed at the surface of the hot rolled steel sheet at the hot rolling step. In the pickling step, usually a hydrochloric acid-based solution is used. In the present invention as well, similar conditions can be applied. Further, in the pickling, the internal oxidation layer formed at the time of the hot rolling step is desirably also removed.

(Cold Rolling Step)

The hot rolled steel sheet can be cold rolled to obtain cold rolled steel sheet. The rolling reduction of the cold rolling may be suitably determined in accordance with the desired metallographic structure and sheet thickness. For example, it may be 30 to 90%. In the present invention, it is sufficient to suitably adjust the rolling reduction at the hot rolling step and the rolling reduction at the cold rolling step to obtain the final desired sheet thickness, but the thickness of the steel sheet in the present invention is a thin 0.4 to 2.0 mm, therefore to prevent fracture at the cold rolling step, for example, the rolling reduction at the hot rolling step should be made larger than the rolling reduction at the cold rolling step.

(Grinding Step)

It is preferable to perform a grinding step so as to remove foreign matter remaining at the steel sheet surface and further remove the scale and internal oxidation layer formed at the surface and surface layer of the steel sheet at the time of hot rolling and also make the surface properties uniform and promote the formation of an internal oxidation layer at the next annealing step. More specifically, by performing a grinding step to sufficiently remove the internal oxidation layer formed at the time of hot rolling while further imparting strain to the surface of the steel sheet, diffusion of oxygen from the steel sheet surface to the inside in the annealing atmosphere is promoted and further reaction with the oxygen is activated, therefore it becomes possible to promote the formation of the internal oxidation layer at the annealing step. The grinding step is not particularly limited, but, for example, heavy grinding brushes can be used to grind the surface of the steel sheet. The number, rotational speeds, materials, etc. of the heavy grinding brushes can be suitably selected to achieve the desired surface roughness and ground amounts. The ground amount is preferably 2.0 g/m$^2$ or more per surface in the total of all of the heavy grinding brushes. The grinding step can be provided before the later explained annealing and plating line.

Due to the grinding step, it is possible to adjust the shape of the steel sheet surface. Typically, it is made 1.80≥L/ L0≥1.01.

Figure 3:
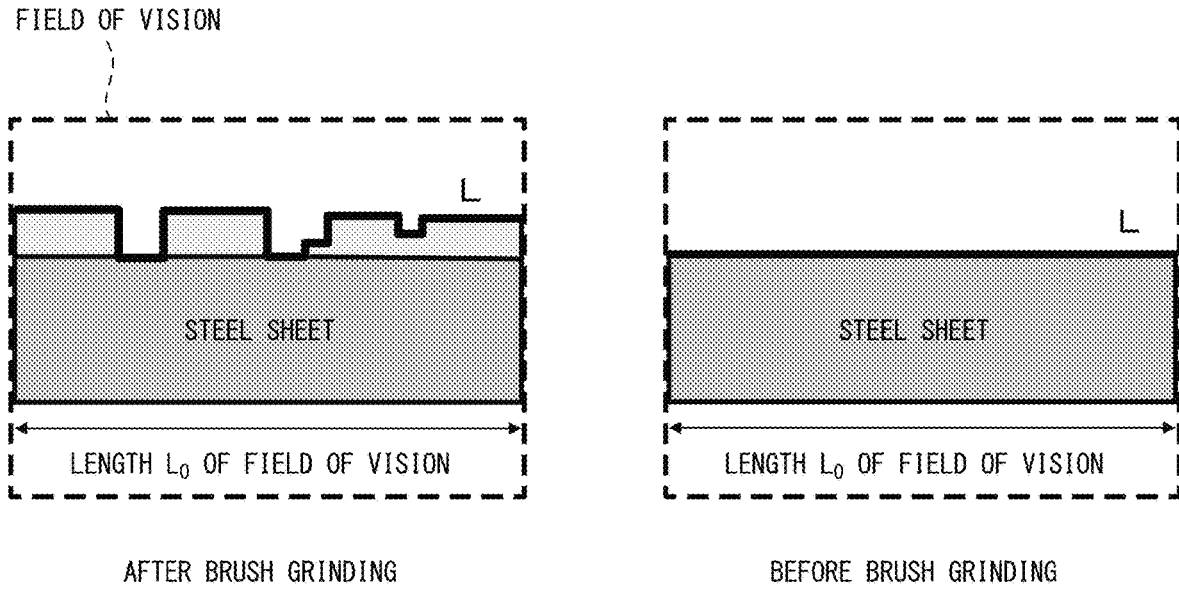
FIG. 3 is a view illustratively explaining L/L0 of steel sheet.

FIG. 3 is a schematic view for explaining L and L0. When examining the cross section of a steel sheet, it is possible to confirm the length of the contour line (surface contour line) defining the surface of the steel sheet. Schematically, the length of the contour line before the grinding step is L and the contour line after the grinding step is L0. That is. L/L0 may also be referred to as the measure of the irregular shape of the steel sheet surface.

Here, the method for measuring L and L0 will be explained. The steel sheet is cut at the center in the sheet width direction so that a cross section of the steel sheet including the sheet width direction and rolling direction can be examined. As shown in FIG. 3, the field of vision in examination of the cross section of the steel sheet is made a rectangular shape and the field of vision is adjusted so that the contour line defining the surface of the steel sheet (sometimes referred to as the "surface contour line") fits in the field of vision. That is, the field of vision is adjusted so that surface contour line does not stick out from the field of vision (rectangular shape) by making it cross the left and right sides of the field of vision (rectangular shape), but does not contact the top and bottom sides of the field of vision (rectangular shape). L indicates the length of the contour line defining the surface of the steel sheet (surface contour line) in that field of examination of cross section. L0 indicates the length of the steel sheet in the rolling direction in the field of examination of cross section and generally corresponds to the distance between the left and right sides of the field of vision (rectangular shape). The cross section is examined at three or more locations of the steel sheet and the L/L0 found at the cross sections (fields of vision) are averaged to thereby obtain the L/L0 in the present embodiment. The cross sections are examined using a scan type electron micrograph (SEM).

While not desiring to be bound by any specific theory. L/L0 may be considered to be related to the relative magnitude of the surface area of the steel sheet. L is the length of the surface contour after the grinding step, while L0 corresponds to the length of the control of the surface of the steel sheet before the grinding step. Due to the grinding step, the steel sheet surface is ground down, the irregularity of the surface contour line increases, the surface contour line becomes longer, and the surface area of the steel sheet increases. That is, the reaction interfaces at the steel sheet surface increase and the formation of the internal oxidation layer and decarburized layer at the subsequent annealing step is promoted. With L/L0 being less than 1.01, the effect of promotion of the formation of the internal oxidation layer and decarburized layer is not sufficiently obtained. On this point, the larger the L/L0 the better. L/L0 may also be 1.03 or more, 1.04 or more, 1.05 or more, 1.06 or more, 1.07 or more, 1.08 or more, 1.09 or more, 1.10 or more, 1.11 or more, 1.12 or more, 1.15 or more, or 1.18 or more.

On the other hand, if L/L0 is too large, the decarburized layer excessively proceeds to be formed, sufficient recarburization is not possible, and the strength of the steel sheet is affected, therefore the upper limit of L/L0 may be made 1.80. On this point, the smaller the L/L0, the more preferable. L/L0 may be 1.70 or less, 1.60 or less, 1.50 or less, 1.48 or less, 1.44 or less. 1.40 or less, 1.35 or less, or 1.30 or less.

It should be noted that the annealing step is performed in an annealing furnace. In general, the steel sheet surface is flattened by a hearth roll provided at the outlet of the annealing furnace, therefore after the annealing step. L/L0 obtained at the grinding step cannot be confirmed.

(Annealing Step)

Next, the obtained cold rolled steel sheet is annealed. The annealing is preferably performed at a 750° C., or more temperature, more preferably 780° C., or more temperature. The upper limit of the annealing temperature may be 920° C., or less from the viewpoint of suppressing the formation of an external oxidation layer. The temperature rising speed up to the annealing temperature is not particularly limited. For example, it may be 1 to 10° C./sec. Further, from the viewpoint of sufficiently forming the internal oxidation layer and suppressing the formation of an external oxidation layer, the holding time at the annealing temperature may be made 5 to 300 seconds, preferably 50 to 100 seconds. If the annealing temperature is too long, the decarburized layer is excessively formed compared with the internal oxidation layer, the A/t value becomes higher, and sometimes sufficient strength cannot be obtained. The atmosphere at the annealing step is an important factor in controlling the internal oxidation layer and decarburized layer. The temperature rising step in the annealing step is made a high oxygen partial pressure (high $P_{O2}$), i.e., a high oxygen potential, then the holding step (further, sometimes referred to as the "soaking step") is made a low oxygen partial pressure (low $P_{O2}$), i.e., a low oxygen potential. As the means for controlling the oxygen partial pressure $P_{O2}$ or oxygen potential, it is possible to control the dew point temperature of the combustion atmosphere, control the hydrogen concentration, or adopt a method combining these. By controlling the oxygen partial pressure $P_{O2}$ or oxygen potential, if oxygen (O) is supplied to the steel sheet, an internal oxidation layer is formed. Further. $CO_2$ or CO bonded with the carbon (C) inside the steel sheet is discharged into the atmosphere and formation of a decarburized layer is promoted. The oxygen potential can be expressed by the common logarithm log ($P_{H2O}/P_{H2}$) of the value of the water vapor partial pressure $P_{H2O}$ inside the annealing furnace divided by the hydrogen partial pressure $P_{H2}$. To obtain the internal oxidation layer and decarburized layer in the present invention, for example, the value found by the above formula can be controlled to −3.5 to −2.2 as a high oxygen potential at the temperature rising step and to −5.5 to −3.6 as a low oxygen potential at the holding step.

If the oxygen potential at the temperature rising step is less than −3.5, an internal oxidation layer and decarburized layer are liable to not be formed on the surface of the steel sheet. On the other hand, if the oxygen potential at the temperature rising step is more than −2.2, decarburization excessively progresses and the strength of the steel sheet is liable to fall. It should be noted that, from the viewpoint of forming the desired internal oxidation layer and decarburized layer, the range of the oxygen potential at the temperature rising step can be freely selected in the above range. That is, the upper limit and lower limit of the range of the oxygen potential at the temperature rising step may be suitably selected in the range of −3.5 to −2.2.

Next, the oxygen potential at the holding step is lower than the oxygen potential of the temperature rising step at −3.6 or less. If the oxygen potential of the holding step is −3.6 or less, the decarburized layer formed at the temperature rising step can be reduced at the holding step. This believed to be because C diffusion from the inside of the steel sheet occurs in the holding step as well, but the oxygen potential of the atmosphere is low, i.e., oxygen (O) is not sufficiently supplied from the atmosphere, therefore carbon (C) diffused at the inside of the steel does not form $CO_2$ or CO, the decarburized layer formed at the temperature rising step is reduced in thickness, and the C concentration in the decarburized layer becomes higher (i.e., is recarburized). The lower limit of the oxygen potential in the holding step is not particularly prescribed, but even if making the oxygen potential excessively low, it is believed that the recarburization effect would become saturated. From this and from the viewpoint of the production costs, the lower limit may be made-5.5 or more. It should be noted that from the viewpoint of the desired thickness of the decarburized layer and obtaining recarburization, it is possible to suitably select the range of oxygen potential in the holding step to within the above range. That is, the upper limit and lower limit of the range of oxygen potential in the holding step may be respectively suitably selected in the range of −5.5 to −3.6.

As the technique for adjusting the oxygen potential, it is possible to employ the method of using a combustion atmosphere, adding a trace amount of oxygen, and making the dew point rise, or combining these. If controlling the dew point, the dew point in the temperature rising step may be made −15 to 15° C., and is preferably −10° C., or more. If the dew point at the temperature rising step is too low, an internal oxidation layer and decarburized layer are liable to not be formed on the surface of the steel sheet. If the dew point at the temperature rising step is more than 15° C., the decarburization excessively proceeds and the strength of the steel sheet is liable to fall. Next, the dew point at the holding step may be −30° C., or less, preferably is −40° C., or less. If the dew point at the holding step is −30° C., or less, the decarburized layer formed at the temperature rising step can be reduced at the holding step. The lower limit of the dew point at the holding step is not particularly set, but even if making the dew point excessively low, it is believed that the recarburization effect would become saturated. From this and from the viewpoint of the production costs, the lower limit may be made −80° C., preferably −60° C., more preferably −50° C. Further, the atmosphere at the time of annealing is preferably a reducing atmosphere, more preferably a reducing atmosphere containing nitrogen and hydrogen, for example, may be a reducing atmosphere of hydrogen 5% or less (for example, hydrogen 5% and nitrogen 95%). It should be noted that the annealing step can be performed consecutively after formation of the plating layer containing zinc explained later (zinc-based plating layer).

[Formation of Plating Layer Containing Zinc (Zinc-Based Plating Layer)]

The zinc-based plating layer can be formed by electrogalvanization or by hot dip galvanization, but preferably is formed by hot dip galvanization. In the case of hot dip galvanization, the plating conditions may be suitably set considering the desired chemical composition, thickness, amount of deposition, etc. of the plating layer. For example, the cooling after annealing may be stopped at 430 to 500° C., and the cold rolled steel sheet may be dipped in the hot dip galvanization bath for 1 to 5 seconds. The amount of plating deposition may, for example, be made 10 to 100 g/m².

After forming the zinc-based plating layer, to improve the weldability and/or coatability, the layer is preferably alloyed. The alloying conditions may be made within the usual ranges. For example, the alloying may be performed at a 450 to 600° C. temperature.

[Chemical Conversion]

In one embodiment, in place of plating, chemical conversion may also be performed. By having an internal oxidation layer, the steel sheet according to the present invention is not only excellent in plateability, but also is excellent in chemical convertibility. The chemical conversion can be performed using a general technique. For example, it is also possible to mainly perform phosphate treatment and also use oxalate treatment, chromate treatment, blackening treatment, passivation treatment, etc.

EXAMPLES

Below; the present invention will be explained in more detail by examples, but the present invention is not limited in any way to these examples.

Examples A: Production of Steel Sheet

In the present examples, steel sheets having thicknesses of 0.4 to 2.0 mm (400 to 2000 μm) and widths of 1000 mm were produced. Several steel sheets were treated by zinc-based plating to produce zinc-based plated steel sheets, while several other steel sheets were chemically converted to produce chemically converted steel sheets. First, molten steels adjusted in chemical composition were cast to form steel slabs. The steel slabs were cooled once, then were reheated and hot rolled by 50% or more rolling reductions. The obtained hot rolled steel sheets were coiled up. In all of the examples, the heating temperature of the steel slabs at the time of reheating was made 1200° C., and the finish rolling temperature was made 950° C. After that, hydrochloric acid was used to pickle the steels and remove the surface scale down to 0.2 μm or less. After the pickling, the steels were cold rolled. From each cold rolled steel sheet, a sample was taken by a method based on JIS G0417: 1999 and the chemical composition of the steel sheet was analyzed. Further, any parts at five locations of the cold rolled steel sheet were measured for thickness of the steel sheet by a micrometer. These were averaged to calculate the sheet thickness "t". The chemical compositions and sheet thicknesses of the examples are shown in Table 1. It should be noted that in all examples, the chemical compositions of the steel sheets contained O: 0.010% or less.

Next, each cold rolled steel sheet was ground at its surface using heavy grinding brushes, then was annealed and plated or chemically converted. The ground amount was, by total of all heavy grinding brushes. 2.0 g/m² or more per surface of the steel sheet. In Table 1, the "plating type A" means "hot dip galvannealed steel sheet (GA)", the "plating type B" means "hot dip Zn—Al plated steel sheet (GI)", and the "plating type C" means "hot dip Zn—Al—Mg plated steel sheet". The chemical conversion formed a zinc phosphate film. The temperature at the annealing was made 750 to 920° C., in range, the temperature rising speed was made 1 to 10° C./sec, the holding time was made 5 to 300 seconds, and the oxygen potentials at the temperature rising step and the holding step were made as described in Table 1. Further, the annealing atmosphere was a reducing atmosphere of hydrogen 4% and nitrogen 96% and was controlled to an oxygen potential determined by the formula log ($P_{H2O}/P_{H2}$). For hot dip galvanization, the cooling after the annealing was stopped at 480° C., the cold rolled steel sheet was dipped in a hot dip galvanization bath for 3 seconds, and the amount of plating deposition was adjusted to become about 50 g/m² or more per surface. It should be noted that in all of the examples having plating layers, the plating layer contained Fe: 5 to 15% and Al: 0.01 to 0.5%.

(Measurement of Thickness A of Decarburized Layer)

The steel sheet of each example was analyzed for composition of the steel sheet in the thickness direction using a high frequency type GDS and the thickness of the decarburized layer was evaluated. In each plated steel sheet, the plating layer was chemically dissolved and removed by a hydrochloric acid solution to which an inhibitor was added, then the thickness of the decarburized layer was evaluated. Specifically, the steel sheet was sputtered from the steel sheet surface toward the thickness direction of the steel sheet for a certain time, then the sputter depth was measured by a laser microscope and the sputter speed per time was calculated. The position at which the C signal intensity of the steel base material was identified and the value of the sputter time when reaching that position converted to depth by the sputter speed was deemed the thickness of the decarburized layer. The above operation was performed at three locations and the thicknesses found at the locations were averaged to thereby obtain the thickness A (μm) (per surface) of the decarburized layer. It should be noted that similar GDS analysis techniques using Mn etc. as the elements covered were used to confirm the presence of the internal oxidation layers at all examples other than No. 17.

(Evaluation of Tensile Strength)

The tensile test was performed using a JIS No. 5 test piece by the method prescribed in JIS-Z2241: 2011. The crosshead test speed of the tensile test was made 30 mm/min. The obtained results are shown in Table 1.

21

(Evaluation of Fatigue Characteristics)

The fatigue characteristics were evaluated by performing a plane bending fatigue test based on JIS Z 2275:1978, finding the fatigue limit ratio (=fatigue/tensile strength), and using that fatigue limit ratio. A sample with a fatigue limit ratio of 0.45 or more was evaluated as "AA", one of 0.40 or more was evaluated as "A", and one of less than 0.40 was evaluated as "B". In the case of evaluation AA and A, a sample was judged passing as having excellent fatigue characteristics, while in the case of evaluation B, it was judged failing. The obtained results are shown in Table 1.

(Evaluation of Plateability)

For evaluation of the plateability, the appearance of the plated steel sheet of each example was evaluated. Specifically, the appearance after plating was visually examined. A sample with no unplated part recognized was evaluated as "A" while one where it was recognized was evaluated as "B". A case evaluated as A was judged passing and a case evaluated as B was judged failing. The obtained results are shown in Table 1.

(Evaluation of Chemical Convertibility)

The method of evaluation of the chemical convertibility was as follows:

The chemical conversion solution used was a chemical conversion solution made by Nihon Parkerizing Co., Ltd. (PALBOND L3065(®)). The chemical conversion was performed by the following method. A sample was degreased by the degreasing solution FINE CLEANER(®) made by Nihon Parkerizing Co., Ltd., then was rinsed. Next, the sample was conditioned on its surface by a surface conditioning solution (PL-XG) made by Nihon Parkerizing Co., Ltd., was dipped in the chemical conversion solution (PALBOND L3065) for 120 seconds, then was rinsed and was dried by hot air.

The chemical film was examined by a scan type electron microscope (SEM) by a power of 500× randomly in five fields, the bare area ratio of the chemical film was measured by image processing, and the film was evaluated as follows by the bare area ratio. A and B are passing.

A: 0% (no bare spots)

B: 5% or less

C: more than 5% and 10% or less

D: more than 10%

The obtained results are shown in Table 1.

In this example, a case where the tensile strength is 550 to 1500 MPa, the fatigue characteristics (fatigue limit ratio) are evaluated as A, and the plateability is evaluated as A or the chemical convertibility is evaluated as A or B was evaluated as steel sheet having sufficient strength and plateability or chemical convertibility.

TABLE 1-1

| No. | Class | Fe | Chemical composition (mass %) | | | | | | | |
| | | | C | Si | Mn | Al | P | S | N | Others |
|---|---|---|---|---|---|---|---|---|---|---|
| 1 | Comp. ex. | Bal. | 0.03 | 0.20 | 1.50 | 0.010 | 0.0034 | 0.0010 | 0.0022 | — |
| 2 | Ex. | Bal. | 0.05 | 1.80 | 0.80 | 0.020 | 0.0110 | 0.0027 | 0.0013 | — |
| 3 | Ex. | Bal. | 0.10 | 1.90 | 1.00 | 0.200 | 0.0089 | 0.0044 | 0.0017 | REM: 0.002 |
| 4 | Ex. | Bal. | 0.12 | 1.40 | 1.30 | 0.500 | 0.0099 | 0.0021 | 0.0012 | Hf: 0.002 |
| 5 | Ex. | Bal. | 0.15 | 2.50 | 1.30 | 0.900 | 0.0099 | 0.0024 | 0.0012 | B: 0.0010 |
| 6 | Ex. | Bal. | 0.15 | 0.50 | 1.30 | 1.200 | 0.0100 | 0.0021 | 0.0015 | Mg: 0.003 |
| 7 | Ex. | Bal. | 0.16 | 0.80 | 2.00 | 1.800 | 0.0131 | 0.0021 | 0.0021 | Zr: 0.035 |
| 8 | Comp. ex. | Bal. | 0.20 | 0.05 | 1.80 | 2.000 | 0.0111 | 0.0021 | 0.0024 | — |
| 9 | Comp. ex. | Bal. | 0.20 | 0.20 | 2.00 | 1.500 | 0.0109 | 0.0021 | 0.0022 | — |
| 10 | Comp. ex. | Bal. | 0.05 | 0.00 | 1.50 | 1.200 | 0.0099 | 0.0015 | 0.0021 | — |
| 11 | Comp. ex. | Bal. | 0.22 | 2.80 | 2.30 | 1.200 | 0.0076 | 0.0014 | 0.0015 | — |
| 12 | Comp. ex. | Bal. | 0.20 | 0.30 | 0.50 | 1.200 | 0.0113 | 0.0018 | 0.0011 | — |
| 13 | Comp. ex. | Bal. | 0.22 | 2.00 | 3.30 | 1.000 | 0.0142 | 0.0016 | 0.0017 | — |
| 14 | Comp. ex. | Bal. | 0.08 | 0.20 | 0.90 | 0.000 | 0.0082 | 0.0014 | 0.0017 | — |
| 15 | Comp. ex. | Bal. | 0.22 | 1.80 | 2.30 | 2.500 | 0.0111 | 0.0021 | 0.0016 | — |
| 16 | Comp. ex. | Bal. | 0.35 | 1.80 | 2.50 | 0.100 | 0.0114 | 0.0023 | 0.0023 | — |
| 17 | Comp. ex. | Bal. | 0.30 | 1.50 | 2.50 | 0.100 | 0.0166 | 0.0011 | 0.0021 | — |
| 18 | Ex. | Bal. | 0.10 | 1.90 | 3.00 | 0.100 | 0.0084 | 0.0010 | 0.0023 | — |
| 19 | Ex. | Bal. | 0.10 | 2.40 | 2.80 | 0.400 | 0.0090 | 0.0022 | 0.0022 | — |
| 20 | Ex. | Bal. | 0.10 | 1.30 | 1.50 | 0.800 | 0.0166 | 0.0011 | 0.0021 | Cr: 1.00 |
| 21 | Ex. | Bal. | 0.10 | 0.70 | 1.50 | 1.700 | 0.0084 | 0.0010 | 0.0023 | Cu: 0.01 |
| 22 | Ex. | Bal. | 0.10 | 1.80 | 1.50 | 1.700 | 0.0233 | 0.0013 | 0.0020 | Ti: 0.030 |
| 23 | Ex. | Bal. | 0.20 | 1.90 | 2.00 | 0.500 | 0.0099 | 0.0015 | 0.0021 | Ni: 0.10 |
| 24 | Ex. | Bal. | 0.15 | 1.40 | 1.80 | 0.900 | 0.0076 | 0.0014 | 0.0015 | — |
| 25 | Ex. | Bal. | 0.20 | 2.50 | 2.00 | 1.200 | 0.0113 | 0.0018 | 0.0011 | Nb: 0.017 |
| 26 | Ex. | Bal. | 0.05 | 0.50 | 2.00 | 1.800 | 0.0142 | 0.0016 | 0.0017 | V: 0.046 |
| 27 | Ex. | Bal. | 0.22 | 2.00 | 2.30 | 0.100 | 0.0082 | 0.0010 | 0.0023 | — |
| 28 | Ex. | Bal. | 0.20 | 0.20 | 1.20 | 1.500 | 0.0111 | 0.0022 | 0.0021 | Mo: 0.41 |
| 29 | Ex. | Bal. | 0.22 | 1.80 | 2.50 | 0.800 | 0.0114 | 0.0011 | 0.0023 | W: 0.01 |
| 30 | Ex. | Bal. | 0.10 | 1.80 | 2.50 | 1.700 | 0.0166 | 0.0010 | 0.0022 | — |
| 31 | Ex. | Bal. | 0.10 | 0.01 | 1.20 | 1.800 | 0.0084 | 0.0010 | 0.0021 | — |
| 32 | Ex. | Bal. | 0.15 | 2.00 | 1.20 | 0.400 | 0.0090 | 0.0022 | 0.0022 | — |
| 33 | Ex. | Bal. | 0.16 | 0.20 | 2.80 | 0.800 | 0.0166 | 0.0011 | 0.0021 | Ca: 0.001 |
| 34 | Ex. | Bal | 0.20 | 1.80 | 1.50 | 1.700 | 0.0084 | 0.0010 | 0.0023 | — |
| 35 | Ex. | Bal. | 0.15 | 1.40 | 1.80 | 0.900 | 0.0076 | 0.0014 | 0.0015 | — |
| 36 | Comp. ex. | Bal. | 0.03 | 0.20 | 1.50 | 0.010 | 0.0034 | 0.0010 | 0.0022 | — |
| 37 | Comp. ex. | Bal. | 0.15 | 1.00 | 2.00 | 0.050 | 0.0100 | 0.021 | 0.0015 | |

TABLE 1-2

| No. | Class | Irregular shape of steel sheet surface of cold rolled sheet (L/L0) | Brush grinding | Temp. rising step | Soaking step | Plating type | Decarburized layer thickness A μm | Sheet thickness "t" mm |
|---|---|---|---|---|---|---|---|---|
| | | | | Oxygen potential log(PH2O/PH2) | | | | |
| 1 | Comp. ex. | 1.80 | Yes | −2.8 | −4.0 | A | 20 | 0.4 |
| 2 | Ex. | 1.28 | Yes | −3.0 | −4.1 | A | 40 | 0.4 |
| 3 | Ex. | 1.29 | Yes | −3.1 | −4.4 | Steel sheet | 60 | 0.8 |
| 4 | Ex | 1.30 | Yes | −3.0 | −4.4 | C | 80 | 1.0 |
| 5 | Ex. | 1.21 | Yes | −2.9 | −5.0 | B | 30 | 0.5 |
| 6 | Ex. | 1.11 | Yes | −2.9 | −4.4 | B | 60 | 0.8 |
| 7 | Ex. | 1.15 | Yes | −2.9 | −4.7 | B | 80 | 0.8 |
| 8 | Comp. ex. | 1.34 | Yes | −2.8 | −2.7 | A | 150 | 0.8 |
| 9 | Comp. ex. | 1.77 | Yes | −1.9 | −4.4 | Steel sheet | 160 | 1.0 |
| 10 | Comp. ex. | 1.44 | Yes | −2.7 | −5.4 | A | 100 | 1.2 |
| 11 | Comp. ex. | 1.45 | Yes | −2.5 | −5.2 | B | 130 | 1.2 |
| 12 | Comp. ex. | 1.67 | Yes | −3.2 | −4.7 | A | 150 | 1.2 |
| 13 | Comp. ex. | 1.52 | Yes | −3.0 | −4.6 | C | 90 | 1.6 |
| 14 | Comp. ex. | 1.51 | Yes | −2.7 | −4.6 | A | 90 | 1.4 |
| 15 | Comp. ex. | 1.50 | Yes | −2.7 | −4.6 | Steel sheet | 140 | 1.8 |
| 16 | Comp. ex. | 1.48 | Yes | −3.2 | −3.7 | A | 60 | 2.0 |
| 17 | Comp. ex. | 1.50 | Yes | −4.1 | −4.4 | A | 0 | 2.0 |
| 18 | Ex. | 1.09 | Yes | −3.2 | −4.4 | Steel sheet | 100 | 2.0 |
| 19 | Ex. | 1.07 | Yes | −3.3 | −4.8 | B | 100 | 1.4 |
| 20 | Ex. | 1.08 | Yes | −3.4 | −4.9 | A | 120 | 1.4 |
| 21 | Ex. | 1.11 | Yes | −3.0 | −5.1 | A | 80 | 1.4 |
| 22 | Ex. | 1.48 | Yes | −3.0 | −4.3 | A | 60 | 2.0 |
| 23 | Ex. | 1.12 | Yes | −2.5 | −4.0 | C | 70 | 1.8 |
| 24 | Ex. | 1.09 | Yes | −2.5 | −4.6 | B | 110 | 1.8 |
| 25 | Ex. | 1.08 | Yes | −2.4 | −4.6 | Steel sheet | 100 | 1.2 |
| 26 | Ex. | 1.09 | Yes | −2.2 | −3.6 | A | 30 | 1.2 |
| 27 | Ex. | 1.18 | Yes | −2.8 | −5.3 | A | 150 | 1.2 |
| 28 | Ex. | 1.21 | Yes | −3.0 | −5.3 | A | 200 | 1.6 |
| 29 | Ex | 1.05 | Yes | −2.4 | −4.8 | Steel sheet | 50 | 1.4 |
| 30 | Ex. | 1.18 | Yes | −2.6 | −3.6 | A | 140 | 1.8 |
| 31 | Ex. | 1.11 | Yes | −3.3 | −4.3 | Steel sheet | 140 | 2.0 |
| 32 | Ex. | 1.05 | Yes | −2.7 | −4.9 | B | 90 | 0.8 |
| 33 | Ex. | 1.05 | Yes | −2.8 | −4.4 | B | 90 | 0.8 |
| 34 | Ex. | 1.08 | Yes | −2.8 | −5.4 | C | 70 | 0.8 |
| 35 | Ex. | 1.44 | Yes | −2.5 | −4.6 | B | 110 | 0.7 |
| 36 | Comp. ex. | 1.86 | Yes | −3.2 | −4.0 | A | 220 | 0.4 |
| 37 | Comp. ex. | 1.02 | No | −2.9 | −4.4 | A | 5 | 1.2 |

| No. | A/t | C½ ≥ Cb/2 | Tensile strength MPa | Fatigue limit ratio (adding AA) | Plateability | Chemical convertibility |
|---|---|---|---|---|---|---|
| 1 | 0.05 | Yes | 350 | A | A | — |
| 2 | 0.10 | Yes | 580 | AA | A | — |
| 3 | 0.08 | Yes | 625 | AA | — | B |
| 4 | 0.08 | Yes | 655 | AA | A | — |
| 5 | 0.06 | Yes | 985 | AA | A | — |
| 6 | 0.08 | Yes | 720 | AA | A | — |
| 7 | 0.10 | Yes | 890 | AA | A | — |
| 8 | 0.19 | No | 730 | B | A | — |
| 9 | 0.16 | No | 725 | B | — | A |
| 10 | 0.08 | Yes | 490 | A | A | — |
| 11 | 0.11 | Yes | 1760 | A | B | — |
| 12 | 0.13 | Yes | 525 | A | A | — |
| 13 | 0.06 | Yes | 1660 | A | B | — |
| 14 | 0.06 | Yes | 495 | A | A | — |
| 15 | 0.08 | Yes | 1820 | A | — | D |
| 16 | 0.03 | Yes | 1560 | A | A | — |
| 17 | 0.00 | Yes | 900 | A | B | — |
| 18 | 0.05 | Yes | 965 | AA | — | A |
| 19 | 0.07 | Yes | 1125 | AA | A | — |
| 20 | 0.09 | Yes | 725 | AA | A | — |
| 21 | 0.06 | Yes | 835 | AA | A | — |
| 22 | 0.03 | Yes | 1050 | A | A | — |
| 23 | 0.04 | Yes | 885 | AA | A | — |
| 24 | 0.06 | Yes | 825 | AA | A | — |
| 25 | 0.08 | Yes | 1350 | AA | — | A |
| 26 | 0.03 | Yes | 795 | A | A | — |

TABLE 1-2-continued

| | | | | | | |
|---|---|---|---|---|---|---|
| 27 | 0.13 | Yes | 915 | AA | A | — |
| 28 | 0.13 | Yes | 585 | AA | A | — |
| 29 | 0.04 | Yes | 1430 | AA | — | A |
| 30 | 0.08 | Yes | 1490 | AA | A | — |
| 31 | 0.07 | Yes | 705 | AA | — | A |
| 32 | 0.11 | Yes | 915 | AA | A | — |
| 33 | 0.11 | Yes | 765 | AA | A | — |
| 34 | 0.09 | Yes | 995 | AA | A | — |
| 35 | 0.15 | Yes | 825 | A | A | — |
| 36 | 0.550 | No | 350 | B | A | — |
| 37 | 0.004 | Yes | 750 | A | B | — |

Referring to Table 1, in Example No. 16, the C content was excessive, therefore the strength of the steel sheet became too high. In Example No. 1, the C content was low, therefore the tensile strength fell. In Example No. 10, the Si content was low, therefore the tensile strength fell. In Example No. 11, the Si content was excessive, therefore deterioration of the surface properties was caused and as a result the plateability fell. In Example No. 12, the Mn content was low, therefore the tensile strength fell. In Example No. 13, the Mn content was excessive, therefore the strength of the steel sheet became too high. In Example No. 14, the Al content was low, therefore the tensile strength fell. In Example No. 15, the Al content was excessive, therefore deterioration of the surface properties was caused and as a result the chemical convertibility fell. In Example No. 17, the oxygen potential in the temperature rising step at the time of annealing was low, therefore an internal oxidation layer and decarburized layer were not formed and sufficient plateability could not be obtained. In Example No. 9, the oxygen potential in the temperature rising step at the time of annealing was high, therefore the decarburized layer was excessively formed compared with the internal oxidation layer and A/t became high, therefore as a result, the fatigue characteristics (fatigue limit ratio) fell. In Example No. 8, the oxygen potential in the holding step (soaking step) was high, therefore the decarburized layer was not sufficiently recarburized and as a result the fatigue properties (fatigue limit ratio) fell. In Example No. 36, the irregular shape (L/L0) of the steel sheet surface by brush grinding did not fall in a suitable range. At the time of annealing, the decarburized layer excessively proceeded to be formed. A/t rose, and as a result the fatigue properties (fatigue limit ratio) fell. In Example No. 37, brush grinding was not performed, therefore the internal oxidation layer and decarburized layer were not formed well and sufficient plateability could not be obtained. In contrast to this, in all of the examples according to the present invention, by suitably controlling the chemical composition of the steel sheet, the presence of an internal oxidation layer of the steel sheet surface, the ratio (A/t) of the thickness of the decarburized layer and the thickness of the steel sheet, and C concentration inside the decarburized layer, it was possible to achieve sufficient strength and plateability or chemical convertibility.

INDUSTRIAL APPLICABILITY

The steel sheet according to the present invention has sufficient plateability or chemical convertibility and strength, therefore high strength steel sheet excellent in appearance properties and plated steel sheet using the same can be provided. The steel sheet and plated steel sheet can be suitably used for automobiles, household electrical appliances, building materials, and other applications, in particular for automobiles. Therefore, the present invention can be said to be an invention with an extremely high value in industry.

The invention claimed is:

1. A steel sheet having a chemical composition containing, by mass %,
C: 0.05 to 0.30%,
Si: 0.01 to 2.50%,
Mn: 0.80 to 3.00%,
Al: 0.010 to 2.000%,
P: 0.1000% or less,
S: 0.1000% or less,
N: 0.0300% or less,
O: 0.010% or less,
B: 0 to 0.0100%,
Ti: 0 to 0.100%,
Nb: 0 to 0.100%,
V: 0 to 0.100%,
Cr: 0 to 1.00%,
Ni: 0 to 0.10%,
Cu: 0 to 0.10%,
Mo: 0 to 0.50%,
W: 0 to 0.50%,
Ca: 0 to 0.100%,
Mg: 0 to 0.100%,
Zr: 0 to 0.100%,
Hf: 0 to 0.100%, and
REM: 0 to 0.100% and
having a balance comprising Fe and impurities and
having a thickness of 0.4 to 2.0 mm,
in which steel sheet,
a tensile strength is 550 to 1500 MPa,
an internal oxidation layer and decarburized layer are contained,
wherein the decarburized layer is a region from a surface of the steel sheet to a region inside of the steel sheet in which a C concentration becomes lower compared with a bulk C concentration of the steel sheet,
wherein when a thickness of the decarburized layer per side of the steel sheet: A ($\mu$m), the bulk C concentration of the steel sheet: Cb (%), and a thickness of the steel sheet: t ($\mu$m),
$0.01 \leq A/t \leq 0.15$ per side of the steel sheet, and
wherein a C concentration at the A/2 position is Cb/2 or more per side of the steel sheet.

2. The steel sheet according to claim 1, wherein the A/t is $0.04 \leq A/t \leq 0.15$.

3. A plated steel sheet comprising the steel sheet according to claim 2 having a plating layer containing zinc on the steel sheet.

4. The plated steel sheet according to claim 3, wherein the plated steel sheet is a hot dip galvannealed steel sheet, the chemical composition of the plating layer contains, in mass %, Fe: 5 to 15% and Al: 0.01 to 0.5% and has a balance of Zn and impurities, and an amount of deposition per surface of the plating layer is 10 to 100 g/m$^2$.

5. A plated steel sheet comprising the steel sheet according to claim 1 having a plating layer containing zinc on the steel sheet.

6. The plated steel sheet according to claim 5, wherein the plated steel sheet is a hot dip galvannealed steel sheet, the chemical composition of the plating layer contains, in mass %, Fe: 5 to 15% and Al: 0.01 to 0.5% and has a balance of Zn and impurities, and an amount of deposition per surface of the plating layer is 10 to 100 g/m$^2$.

\* \* \* \* \*